(12) United States Patent
Woolgar et al.

(10) Patent No.: US 7,135,985 B2
(45) Date of Patent: Nov. 14, 2006

(54) CONTROLLING A HOME ELECTRONICS SYSTEM

(75) Inventors: David J. Woolgar, Horsham (GB); Peter P. M. Severeijns, Powell, TN (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 115 days.

(21) Appl. No.: 10/510,308

(22) PCT Filed: Mar. 21, 2003

(86) PCT No.: PCT/IB03/01188

§ 371 (c)(1),
(2), (4) Date: Oct. 6, 2004

(87) PCT Pub. No.: WO03/085618

PCT Pub. Date: Oct. 16, 2003

(65) Prior Publication Data

US 2005/0168658 A1 Aug. 4, 2005

(30) Foreign Application Priority Data

Apr. 11, 2002 (GB) ................................. 0208317.8

(51) Int. Cl.
*G05B 19/02* (2006.01)
*G05B 23/00* (2006.01)

(52) U.S. Cl. .................. 340/825.22; 340/505

(58) Field of Classification Search ................ 340/505, 340/825.22
See application file for complete search history.

(56) References Cited

U.S. PATENT DOCUMENTS

| | | | |
|---|---|---|---|
| 4,817,203 A | | 3/1989 | Tsurumoto et al. ......... 348/734 |
| 5,787,259 A | * | 7/1998 | Haroun et al. .............. 709/253 |
| 2003/0079001 A1 | * | 4/2003 | Chamberlain ............... 709/220 |
| 2003/0179867 A1 | * | 9/2003 | Piepho et al. ............ 379/90.01 |

FOREIGN PATENT DOCUMENTS

| | | |
|---|---|---|
| EP | 0398550 A2 | 11/1990 |
| EP | 0398550 A3 | 11/1990 |
| WO | WO9849824 A1 | 11/1998 |
| WO | WO0070578 A1 | 11/2000 |

* cited by examiner

*Primary Examiner*—Donnie L. Crosland

(57) ABSTRACT

In an apparatus (200) arranged to control a home electronics system, the apparatus being managed independently of a user, the apparatus includes a data processing unit (CPU (204), Program ROM (208) and RAM (210)), a first communications port (202) operable to receive a command, a second communications port (216) operable to receive a signal indicating an operative component in the system, and a third communications port (218) operable to output a substitute command to a component in the system. On receiving a command, the data processing unit may produce at least one substitute command in dependence on the operative component, this substitute command then being communicated to a component in the system.

23 Claims, 4 Drawing Sheets

CONTROLLING A HOME ELECTRONICS SYSTEM

BACKGROUND OF THE INVENTION

1. Field of the Invention

The present invention relates to a method and apparatus for the control of a home electronics system comprising a plurality of components.

2. Description of the Related Art

Home entertainment components such as TV, VCR, DVD and audio receiver are sold as individual products. Brands compete on the basis of features and other factors. Products incorporate standardized signal interfaces (RCA, Scart, etc.) to facilitate interconnection between brands. However, each product is essentially controlled as a standalone equipment with its own user interface and, usually, dedicated remote controller. The user of a home electronics system ends up with a host of remote controllers. To control a particular product, the user must locate the correct remote controller and remember which keys to press to invoke the desired function; indeed some functions require more than one product to be set-up, in turn requiring the use of more than one remote controller. Another issue is that as the number of product features increases, the tendency is for manufacturers to use display-based user interfaces so as to limit the number of keys on remote controllers; the result is that individual products (and their associated remote controllers) are increasingly operated using generic commands such as 'menu', 'cursor_up'/_down/_left/_right, 'OK', etc. Thus there may be a duplication of generic commands across the set of remote controllers the user may possess; a duplication which has not been exploited.

To date, the universal remote control has become a popular means to control a plurality of products. However, these universal remote controls have the disadvantage that the user has to remember to change (product) mode in order to change control to another product.

International Patent Application No. WO 00/700578, assigned to the Assignee of present application, discloses a system and method for controlling multiple home electronics devices. It describes the use of a single remote control (e.g., the TV remote) to control a device controller which, in turn, controls other home devices in addition to the TV. In response to receiving commands from the remote control, the device controller generates and transmits commands suitable for controlling any of the home devices. A disadvantage of this system (and also of the universal remote control discussed earlier) is the requirement to involve the user in initialization and (as required, for example, when adding a device to the system) updating procedures to ensure that commands are correctly translated. This can be a significant burden for a user.

SUMMARY OF THE INVENTION

It is an object of the present invention to overcome these and other disadvantages through an improved method and apparatus for controlling a home electronics system.

In accordance with the present invention, there is provided a method for controlling a home electronics system comprising a plurality of components, the method being managed independently of a user and invoked on receipt of a command, the method comprising the steps of:

sensing an operative component in the system;

adapting the command to produce at least one substitute command in dependence on the operative component; and for each substitute command, communicating the substitute command to a component in the system, this component being operable to respond to the substitute command.

The method of the present invention removes from the user the burden of configuring the system (for example, initialization and/or updating of the configuration as components are added to or removed from the system). The mechanism used to achieve this may include a received command recognition capability whereby commands addressed to the system can be correctly received, decoded and identified, and a system context sensing capability whereby the status of the home electronics system can be monitored to identify one or more presently operative components and detect subsequent changes as and when they occur.

The system context may be changed using a variety of methods, including but not limited to manual control of a component by means of its local user interface, or remote control by means of explicit commands.

Also, in accordance with the present invention, there is provided an apparatus arranged to control a home electronics system, the apparatus being managed independently of a user, the apparatus comprising:

a data processing unit, comprising a CPU, program ROM and RAM;

a first communications port operable to receive a command;

a second communications port operable to receive a signal indicating an operative component in the system; and a third communications port operable to output a substitute command, the data processing unit adapting the command to produce at least one substitute command in dependence on the operative component.

The apparatus of the invention may receive any type of command, for example, issued by the user or on his/her behalf. One example is a keypress on a local keypad of a component in the system. For instance, when the overall system is in 'standby', the user may depress the 'ON' key on the local TV keypad; the apparatus of the invention may receive and adapt this command and, in response, may issue one or more 'on' commands specific to the other system components thereby bringing them out of standby mode in preparation for operation.

Another type of command that might be received by the apparatus is a remote control command. One example is an infrared remote control command associated with a component in the home electronics system. In this case, the apparatus might only perform a simple adaption whereby the command is forwarded to the component using an appropriate medium, as available to the apparatus and discussed in more detail below. A further example might be where the user is viewing a VCR playback. He/she grasps the physically nearest remote control (say, a DVD remote) and presses the 'stop' command on the remote control. The apparatus receives this command and, using a command recognition capability as discussed earlier, it may recognize and decode the low level data encoding, for example, by using a built-in decoder suitable to decode known remote control data protocols (for example, in the case of infrared including, but not limited to, pulse position and Philips RC5/6); it may then identify the command ('DVD stop' in this example), for example, by reference to a built-in store containing data corresponding to command encoding formats. The apparatus may then sense the present operating status of the system (i.e., VCR Play). Based on these data, the apparatus could adapt the 'DVD stop' command into a substitute command suitable for interpretation by the relevant VCR as a 'stop' command. In this example, the received command may utilize a different data encoding method relative to the substitute command. The substitute command may then be sent to a system component, in this case, the relevant VCR, via, any suitable means including, but not limited to, wired (for example, Project50, D2B, IEEE1394/HAVi, USB, RS232, or similar), infrared (for example, pulse position, RC5/6) or radio (for example, Bluetooth, ZigBee, HomeRF, WiFi, IEEE802.11, HiperLAN). For example, the adapted command might be sent as a suitably encoded infrared 'stop' command to the VCR, thereby emulating the infrared remote controller of the VCR.

A yet further type of command is one received from an external wired bus (including, but not limited to, USB, Scart, IEEE1394/HAVi), a wired network (including, but not limited to, Ethernet, RS232, PSTN, ISDN, ADSL) or a wireless network (infrared including, but not limited to, pulse position, RC5/6 and radio including, but not limited to, Bluetooth, ZigBee, HomeRF, WiFi, IEEE802.11, HiperLAN).

Commands and other data may be exchanged with an Internet server via a modem. One example is where the apparatus arranges to automatically download data from an Internet server in response to detecting a new component in the system. To ensure operation with new command codes defined in future products, the apparatus might be remotely programmed, for example, via an Internet server, on detecting a new component in the system, without involving the user. Such updating might be achieved by the apparatus sending to the Internet server a representation of a received command associated with the new system component, the apparatus not being able to decode this received command. The Internet server could then respond with data comprising a set of commands corresponding to the component, this set then being downloaded and stored by the apparatus for use in decoding future received commands.

It can readily be noted that the apparatus may adapt the received commands at a variety of levels including simple transfer (that is, without code conversion) of a command from one medium to another (for example, from IR to wired). Alternatively, or in addition, the command may be converted from one data protocol to another data protocol (for example, from RC5 to Project50). Moreover, the received commands may also be generic in that they are not able, per se, to address (command) a specific component until adapted by the apparatus, examples include 'play' 'stop', 'cursor<direction>', 'OK', etc. Such commands could, for example, emanate from a special proprietary remote control or other user device.

A home electronics system may comprise a plurality of components and an apparatus unit embodying the invention. An existing system might be upgraded by the addition of an apparatus unit connected to the components of the system by any suitable means, for example, using a Scart interface. In general, an apparatus unit may utilize one or more interfaces to receive commands, to sense an operative component in the system and to send commands. The apparatus unit might be integrated within a component of the system. Preferably, such a component would be a TV receiver.

In any of the above scenarios the apparatus unit may sense an operative component by analyzing the characteristics of it's A/V signal output. For example, it is well-known in the art that video playback from VCRs exhibits specific attributes, such as the end-of-field head-switching transient and also synchronization jitter. The apparatus unit could detect such attributes and thereby deduce that a VCR component was presently operative as a source in the system. Other sources may also exhibit particular attributes, for example, an analog video source derived from a tuner as opposed to a DVD player might perhaps be distinguished by the absence of VBI teletext in the latter case. However, the above distinctions are all implicit indicators and thus can be prone to interpretation error, possibly resulting in a non-robust functioning of the system. It is, of course, preferred that an explicit scheme is used to indicate the operative component within the system. One technique might be to use a dedicated identification methodology comprising means to indicate to the apparatus an operative component. Such schemes however are not very attractive commercially, in that they may tie a user to purchasing components of a specific brand and/or possibly make obsolete the user's existing equipment. It is, therefore, preferable to utilize an existing digital data scheme identifying an operative component, the apparatus then being able to sense the operative component by decoding the digital data. Suitable examples include, but are not limited to, Project50 and IEEE1394/HAVi. In a preferred embodiment, the system components and apparatus unit are interconnected using Project50. In this case, the apparatus may be able to explicitly sense a component operative in the system, for example, by monitoring and interpreting the Project50 message traffic between components of the system. In addition, Project50 may also be used to deliver and send commands to/from the apparatus unit as discussed earlier.

BRIEF DESCRIPTION OF THE DRAWINGS

Further features and advantages will now be described, by way of example only, with reference to the accompanying drawings in which.

DESCRIPTION OF THE PREFERRED EMBODIMENTS

Within the following description of embodiments of the present invention, the term 'home electronics system' refers to any system comprising a collection of A/V components, including, but not limited to, TV, VCR, DVD player, recordable DVD, AV receiver and other components including, but not limited to, security system components (sensors, actuators, etc.), personal computers, PC peripherals, home appliances, information appliances and the like. The term 'Project50' refers to versions, as defined from time to time, of the IEC AV-Link specification for signaling using Pin10 of a Scart connection. At the time of filing of the present application, the DM1 specification is emerging. It is to be noted that all references herein to the term 'Project50' include the definition of 'Project50' as incorporated in the DM1 specification or any other subsequent formats, in addition to the aforementioned AV-Link specification. The term 'operative component' means a component within the home electronics system which is, for example, playing media or is the most recently controlled component.

Figure 1:
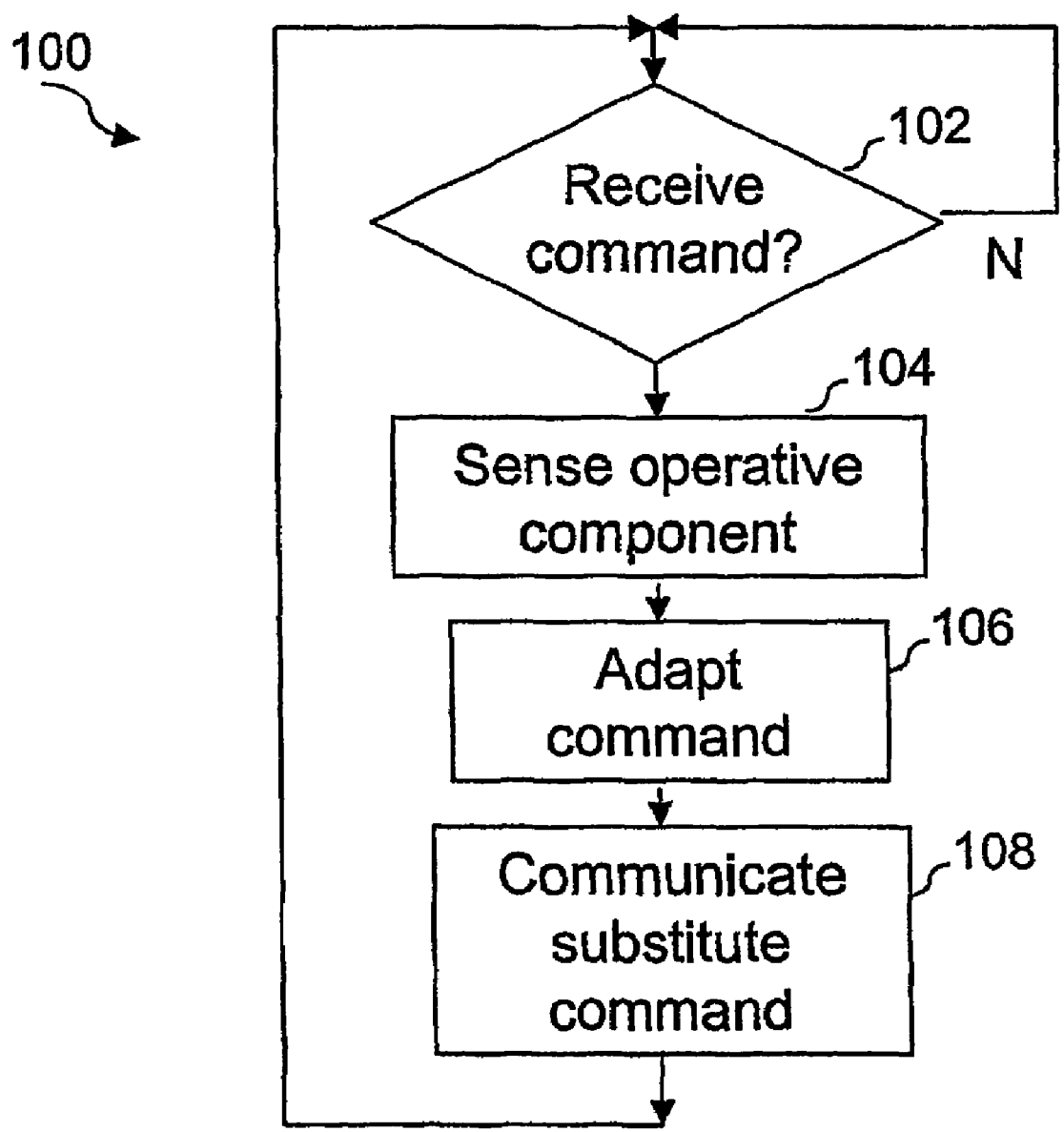
FIG. 1 is a flow diagram of a method according to the invention.

FIG. 1 shows a flow diagram of a method according to the invention. The method is generally indicated at 100. Test 102 checks for a received command. When a command is received, the method senses, at step 104, an operative component and, in dependence on the sensed component, at step 106, adapts the command into a substitute command which is then communicated, at step 108, to a component of the system. The method then loops back to test 102.

Figure 2:
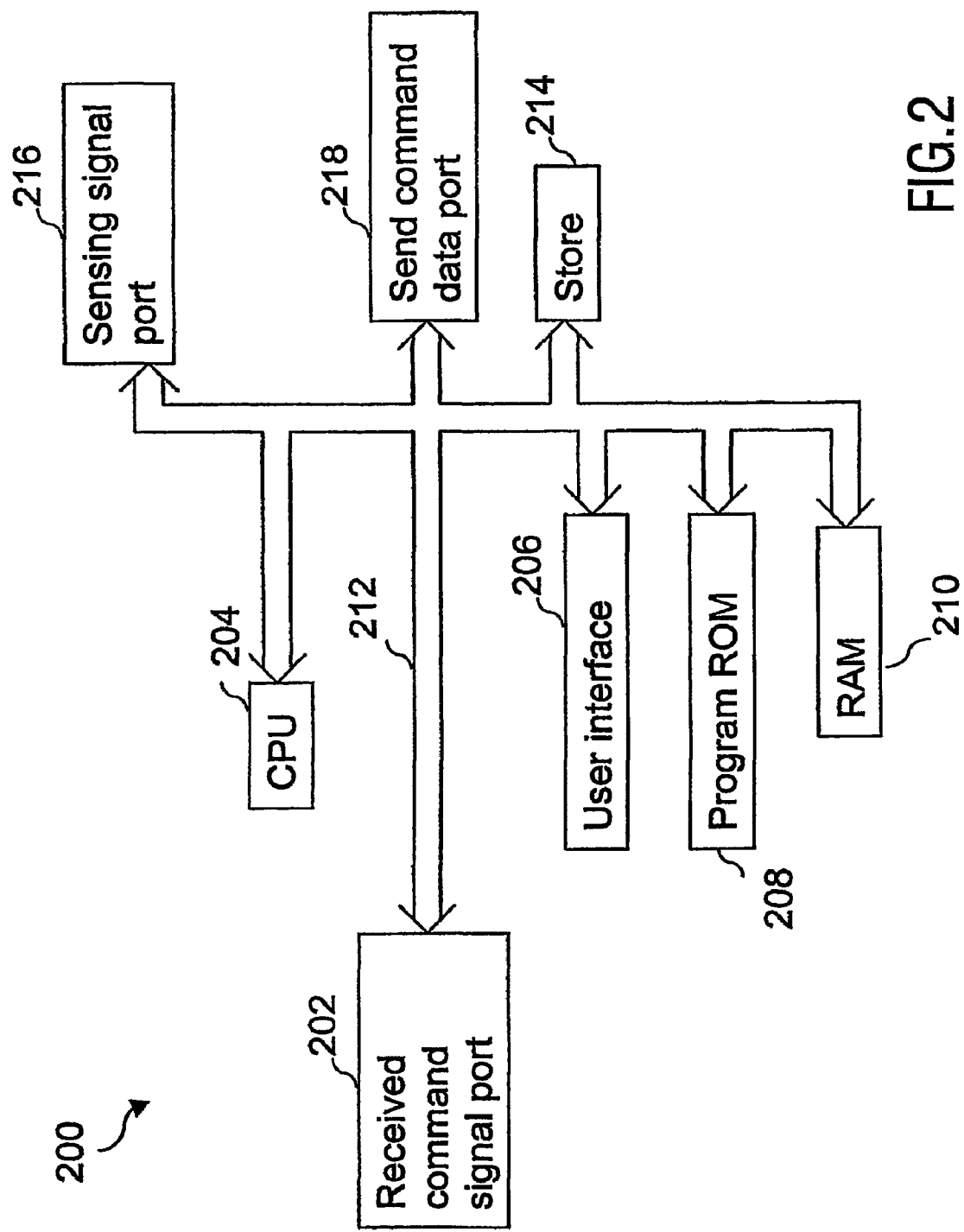
FIG. 2 is a schematic representation of an embodiment of the apparatus unit.

FIG. 2 shows a schematic representation of an embodiment of the apparatus unit. The apparatus unit is shown generally at 200. A command signal is received at port 202. The command signal may include, but is not limited to, a data message conveyed to the apparatus unit by wired or wireless means. The invention is compatible with any command signal coding format including proprietary as well as the various industry standard formats (including, but not limited to, pulse position, ZigBee-PURL, Philips RC5/6 bi-phase coding and Project50 messages). The apparatus unit comprises a data processing unit (including CPU 204, optional user interface 206, program ROM 208, RAM 210, all interconnected by bus 212 in standard fashion, as is known to those skilled in the art). Preferably, the data processing unit (under software program control) decodes the received command signal and identifies the received command message, for example, by comparison with data held in store 214; the identified message may be temporarily stored in RAM 210. A system status information signal is applied at port 216. This may be an information signal which implies the identity of an operative component in the system. Alternatively, the information signal may explicitly identify an operative component. Either way, the data processing unit processes the signal (under software program control) to determine the identity of an operative component, this identity being temporarily stored in RAM 210. With knowledge of the identity of an operative component and of the received command message, the data processing unit may arrange for a substitute command to be produced and sent from the apparatus to a component in the system via send command data port 218. The data processing unit may generate further commands intended for additional components in the system. This facilitates a macro-type feature whereby a set of components might be automatically configured in response to the received command. An example is where a 'stop' command is received when a DVD player is presently 'playing'. In response, the apparatus might issue two commands: one to instruct the DVD player ('DVD-stop') and a second to display a menu ('display_DVD_menu'), thereby reducing the number of operations the user has to perform. Macros may be pre-defined and built into the apparatus to operate various types and combinations of components in a home electronics system.

Each port of the apparatus may utilize additional circuitry in order to interface to wired and/or wireless media as discussed earlier, such circuitry being well-known to the skilled person and, by way of example, an embodiment is described below with respect to FIG. 5.

Concerning the system status information signal input at port 216, this signal might be an analog video signal sourced by an operative component in the system. Characteristics of the signal might be checked by the data processing unit, individually or in combination, to deduce the identity of the operative component. For example, a VCR video output may be characterized by synchronization jitter and/or the head-switching transient near the end of a field interval; either or both these characteristics might be analyzed to deduce that the present playout is from a VCR. In the case of a DVD analog video output, this signal might be considered to very closely resemble an analog broadcast signal (received via terrestrial, cable or satellite); a distinguishing feature of DVD playout might be characterized by the absence of VBI signals such as teletext, VPS and/or broadcaster insertion test signals (for example, 'staircase', or 'pulse and bar'). These characteristics may be tested to deduce the playout is from a DVD player.

Alternatively the system status information signal applied at port 216 may comprise digital data. To minimize processing overhead in the apparatus, a preferred method is one in which the system status information signal includes an easily decodable identifier indicating an operative component. It will be apparent to the skilled person that many suitable schemes may be devised. However, new or proprietary schemes may not be quickly or commercially accepted in the market and, moreover, will be incompatible with the existing population of (so-called 'legacy') components in the field. A preferred method is where the system status information signal is Project50. The data processing unit may monitor and analyze Project50 traffic available at port 216 to explicitly determine an operative component in the system. This has the advantage that an existing, rather than new, signaling scheme may be utilized and that legacy Project50-enabled components already in the field may also be included. For non-Project50-enabled products, the implicit deduction methods described earlier may be used, thereby ensuring that any home electronics system is compatible with the method of the invention.

As discussed, the data processing unit may generate commands to send to components in the system in response to the receipt of a command. It may employ a variety of strategies in order to identify and associate a command encoding suitable for a specific component in the system. One strategy is for the data processing unit to send a command repeatedly to a component, each time using a different command encoding in turn until it senses the component successfully responding to the command, whereupon it may store the relevant encoding type associated with the component in the store 214. Another strategy is for the data processing unit to monitor remote control commands sent by the user to a component, the data processing unit receiving and identifying the command and associating it with a component by sensing the response of a component to the command. These strategies may be especially effective when component response is sensed by monitoring Project50 messages. The above strategies are useful where the commands are sent from the apparatus via infrared or radio. However, sending commands from the apparatus using infrared or radio has practical limitations of line-of-sight and/or range. In addition, such commands must be targeted at a specific component and this may cause problems, for example, where there are identical components in the system and infrared/radio command encoding schemes do not accommodate such duplicate components. A preferred embodiment is where commands are sent via a system level protocol rather than component level protocol, such that a particular component is uniquely identified within the system, regardless of the number, type or brand of components in the system. As discussed earlier, a custom remote control can be used to apply system level commands to the apparatus; similarly, the apparatus can also send commands (via a suitable medium) to specific components of the system using system level commands. A preferred embodiment is to send commands to components of the system using Project50. An alternative preferred embodiment is to send commands to components using IEEE1394/HAVi.

In order to achieve the goal of ensuring zero involvement by the user in initializing and/or updating the apparatus, a preferred embodiment may arrange to decode and identify infrared remote control commands of all major CE brands and specific component types (TV, VCR, . . etc.) within those brands. In addition, the apparatus may also be arranged to decode and identify commands received via other media, such as wired or radio, in particular, via Project50 or IEEE1394/HAVi. In another configuration, the apparatus may alternatively or additionally include decoding and identification of generic remote control commands associated with a custom remote control supplied with the apparatus. Such a custom remote control might include generic function keys such as 'menu', 'cursor' (up/down/ieft/right), 'OK', etc. It is noted that, unlike prior art solutions, the user is not required at any time (i.e., at initial installation or at any subsequent occasion, for example, when adding a new component to the system) to identify to the apparatus any configuration information whatsoever (for example, the identities of the components in the system and/or the commands they use). A further advantage over the prior art is that a user may on any occasion operate the system using any remote control available to hand which contains the required function key(s).

Figure 3:
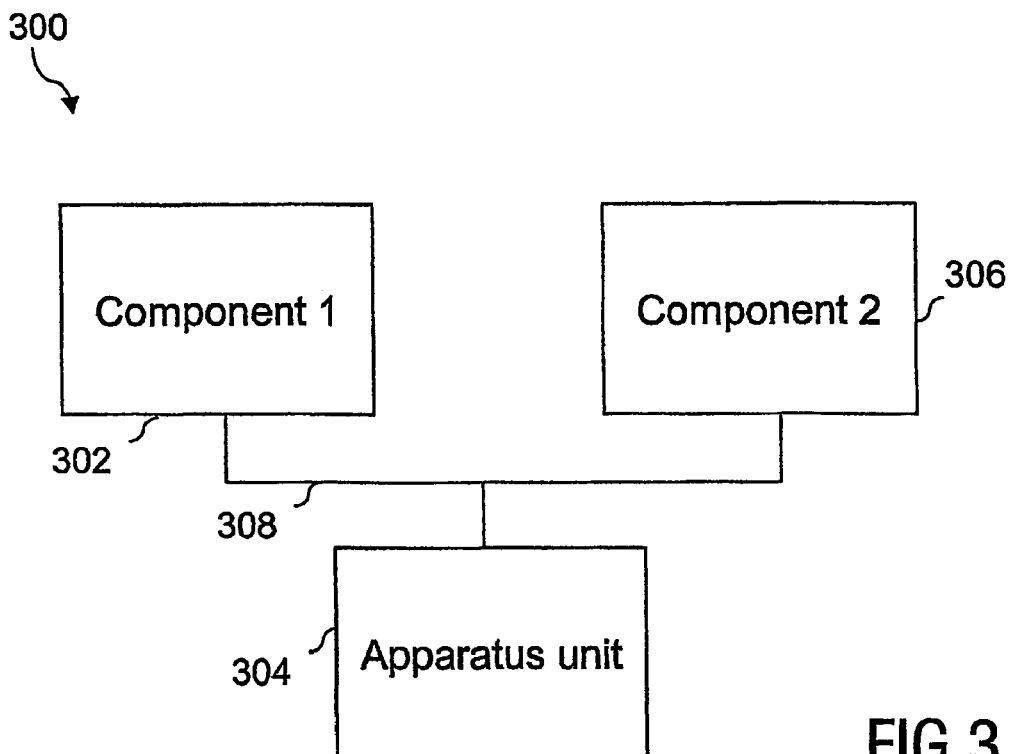
FIG. 3 is a schematic representation of a first embodiment of a home electronics system.

FIG. 3 is a schematic representation of an embodiment of a home electronics system comprising a separate apparatus unit. The home electronics system is shown generally at 300. The system comprises a first component 302, a second component 306 and an apparatus unit 304 all connected via an interconnection means 308. Components in the system can be of any type including, but not limited to, TV, VCR, DVD player, DVD recorder, laserdisc player, audio receiver. A home electronics system may comprise any number or combination of components. In operation, a system comprises at least one component acting as a sink component (that is a component receiving content from another component) and at least one component acting as a source component (that is a component sending content to another component). A typical system usually includes an AV presentation (sink) component or components, for example, a TV, audio amplifier, etc.

The interconnection means 308 may comprise any suitable bus or networking means (wired or wireless) or any combination thereof. Wired schemes include, but not limited to, RS232, USB, Ethernet, Project50, IEEE1394/HAVi. Wireless schemes include, but not limited to, Bluetooth, IEEE802.11, ZigBee, HomeRF, WiFi, other low power radio (e.g. 868 MHz, 915 MHz), IrDA, infrared remote control. With reference to the example of FIG. 2 concerning interfacing the apparatus, any of the above interconnection means may be used in any combination to receive commands, to sense a presently operative component or to send a command to a component, as is readily identifiable by the skilled person. FIG. 3 shows the apparatus being logically distinct from the components of the system. In practice, the apparatus may reside externally to the components or may be integrated within a component.

Figure 4:
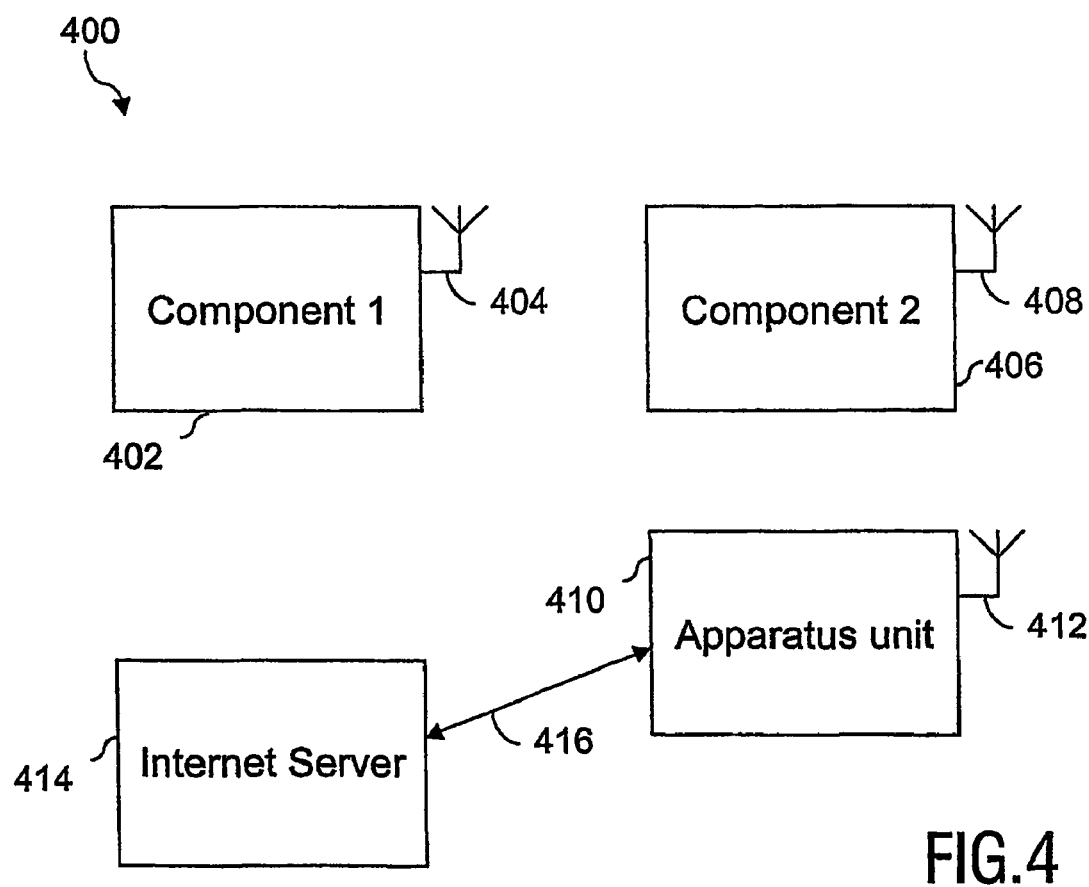
FIG. 4 is a schematic representation of a second embodiment of a home electronics system.

FIG. 4 is a schematic representation of an embodiment of a home electronics system comprising wireless connections between the components and the apparatus. The system is shown generally at 400. The system comprises a first component 402 together with radio antenna 404, a second component 406 and radio antenna 408 and an apparatus 410 and radio antenna 412. The components may be of any type. As indicated, the interconnection may be any suitable radio means; alternatively, other wireless means, such as infrared, may be used. FIG. 4 also shows the apparatus 410 being connected to an Internet Server 414 by means of a 2-way data link 416, the link being wired or wireless, using means known in the art.

Figure 5:
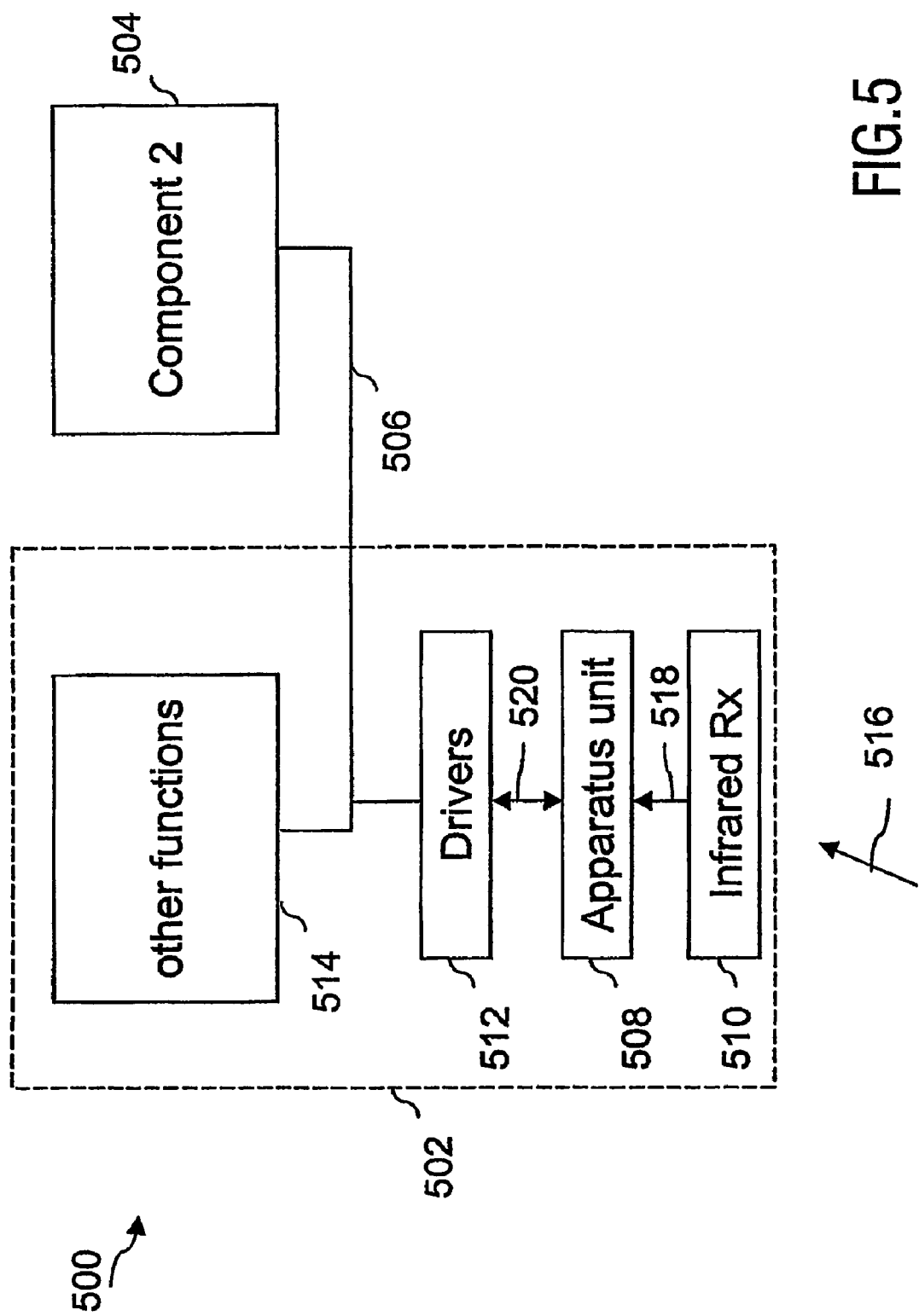
FIG. 5 is a schematic representation of a third embodiment of a home electronics system comprising an apparatus unit integrated within a component.

FIG. 5 is a schematic representation of an embodiment of a home electronics system comprising an apparatus unit integrated within a component. The home electronics system is shown generally at 500. The system comprises a first component 502 (as denoted by the dashed outline) and a second component 504 connected to the first component by interconnection means 506. The first component 502 comprises an apparatus unit 508, an infrared receiver 510, drivers 512 and sundry other functions 514, said functions being unrelated to the present invention. Infrared commands 516 are sent to the component 502. These are received and demodulated by the infrared receiver 510 and forwarded via connection 518 to the received command signal port (see FIG. 2, 202) of the apparatus unit 508. Although interconnection means 506 can comprise any suitable wired or wireless method as discussed earlier, a preferred embodiment for the present example utilizes Project50 carried over Scart. The drivers 512 suitably interface the Project50 bus to the system status signal port (see FIG. 2, 216) and the send command data port (see FIG. 2, 218) of the apparatus unit. The apparatus unit decodes and identifies the received (IR) command, senses the presently operative component (via Project50), and, in response, may issue one or more substitute commands (via Project50) using the method discussed earlier. Component 502 may be a TV receiver or similar central component, the advantage being that the user normally interacts with such a component intuitively and by using the remote control of the component. For such an adapted TV or similar component, commercial advantages include the fact that the apparatus can be implemented by a relatively simple software upgrade since the infrared receiver 510, drivers 512 and the Scart connector (for clarity, not shown in FIG. 5) already exist in typical TV implementations.

Alternatively, the present example utilizes Consumer Electronics Control (CEC) messages carried over the High Definition Multimedia Interface (HDMI). The drivers 512 suitably interface the CEC bus to the system status signal port (see FIG. 2, 216) and the send command data port (see FIG. 2, 218) of the apparatus unit. The apparatus unit decodes and identifies the received (IR) command, senses the presently operative component (via CEC) and, in response, may issue one or more substitute commands (via CEC) using the method discussed earlier. Component 502 may be a TV receiver, display device or similar central component.

The foregoing implementations are presented by way of example only and represent a selection of a range of implementations that can readily be identified by a person skilled in the art to exploit the advantages of the present invention.

In the description above and with reference to FIG. 2, an apparatus 200 is arranged to control a home electronics system, the apparatus being managed independently of a user, the apparatus comprising a data processing unit (CPU 204, Program ROM 208 and RAM 210), a first communications port 202 operable to receive a command, a second communications port 216 operable to receive a signal indicating an operative component in the system, and a third communications port 218 operable to output a substitute command to a component in the system. On receiving a command, the data processing unit may produce at least one substitute command in dependence on the operative component, this substitute command then being communicated to a component in the system.

The invention claimed is:

1. A method for controlling a home electronics system comprising a plurality of components, the method being managed independently of a user and invoked on receipt of a command, the method comprising the steps of:
   sensing an operative component in the system;
   adapting the command to produce at least one substitute command in dependence on the operative component; and
   for each substitute command, communicating the substitute command to a component in the system, said component being operable to respond to the substitute command.

2. An apparatus for controlling a home, electronics system, the apparatus being managed independently of a user, the apparatus comprising:
   a data processing unit, comprising a CPU, program ROM and RAM;
   a first communications port operable to receive a command;
   a second communications port operable to receive a signal indicating an operative component in the system; and
   a third communications port operable to output a substitute command, the data processing unit adapting the command to produce at least one substitute command in dependence on the operative component.

3. The apparatus as claimed in claim 2, wherein the data processing unit comprises a store contains data corresponding to command encoding formats.

4. The apparatus as claimed in claim 2, wherein the first port remote control commands via infrared.

5. The apparatus as claimed in claim 2, wherein the first port receives commands via radio.

6. The apparatus as claimed in claim 2, wherein the first port Project 50 commands via a Scart connection.

7. The apparatus as claimed in claim 2, wherein the first port receives CEC commands via HDMI.

8. The apparatus as claimed in claim 2, wherein the first port receives commands via IEEE1394/HAVi.

9. The apparatus as claimed in claim 2, wherein the first port exchanges data and commands with an Internet server via a modem.

10. The apparatus as claimed in claim 2, wherein the second port signal comprises an A/V signal originating from an operative component, the data processing unit sensing the operative component by analyzing characteristics of the A/V signal.

11. The apparatus as claimed in claim 2, wherein the second port signal comprises digital data identifying an operative component, the data processing unit sensing the operative component by decoding the digital data.

12. The apparatus as claimed in claim 11, wherein the digital data comprises Project50 messages.

13. The apparatus as claimed in claim 11, wherein the digital data comprises CEC messages.

14. The apparatus as claimed in claim 11, wherein the digital data comprises IEEE1394/HAVi messages.

15. The apparatus as claimed in claim 2, wherein the third port outputs the substitute command encoded in accordance with an infrared remote control format.

16. The apparatus as claimed in claim 2, wherein the third port outputs the substitute command encoded in accordance with the Project50 protocol.

17. The apparatus as claimed in claim 2, wherein the third port outputs the substitute command encoded in accordance with the CEC protocol.

18. The apparatus as claimed in claim 2, wherein the third port outputs the substitute command encoded in accordance with the IEEE1394/HAVi protocol.

19. The apparatus as claimed in claim 2, wherein the third port outputs the substitute command encoded in accordance with a radio protocol.

20. A home electronics system comprising a plurality of components and an apparatus according to claim 2.

21. The home electronics system as claimed in claim 20, wherein a component comprises the apparatus.

22. The home electronics system as claimed in claim 21, wherein the component comprising the apparatus is a TV receiver.

23. The home electronics system as claimed in claim 20, wherein the apparatus arranges to automatically download data from an Internet server in response to detecting a new component in the system.

* * * * *